No. 1,485. REISSUED MAY 26, 1863.
J. L. HARDEMAN, DEC'D.
W. N. WHITELEY, ASSIGNEE.
HARVESTING MACHINE.
4 SHEETS—SHEET 1.
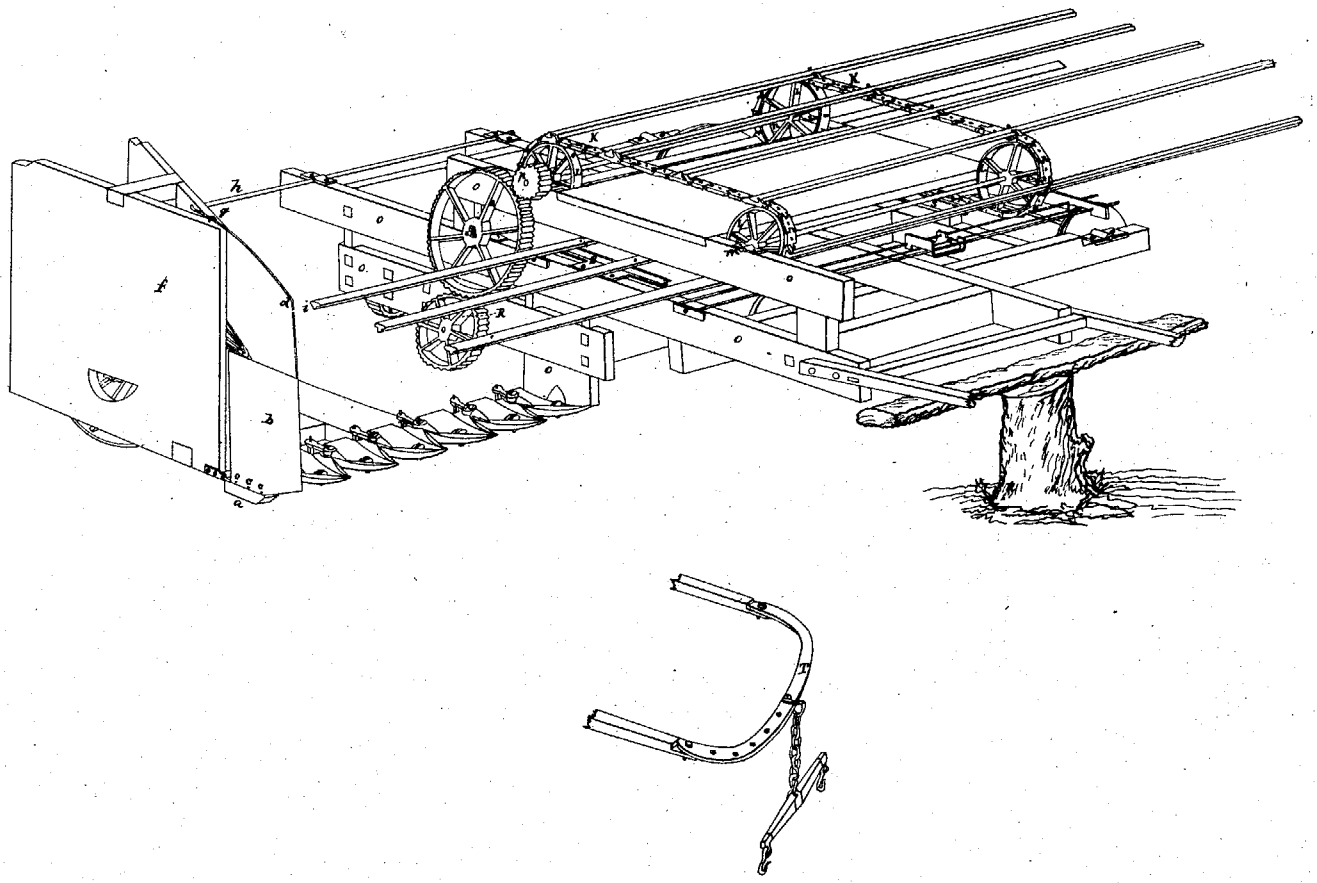
Plate No. 1.
THE NORRIS PETERS CO., WASHINGTON, D. C.

No. 1,485.
REISSUED MAY 26, 1863.
J. L. HARDEMAN, DEC'D.
W. N. WHITELEY, ASSIGNEE.
HARVESTING MACHINE.
4 SHEETS—SHEET 2.
Plate No. 3.
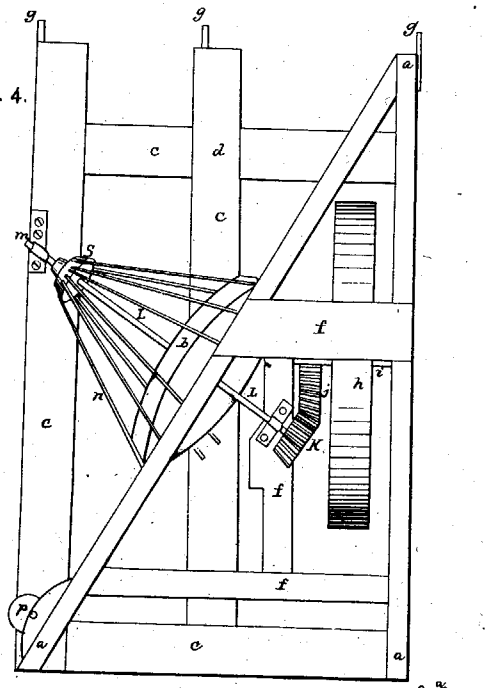
Fig. 4.
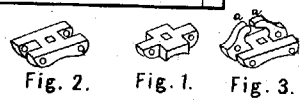
Fig. 1. Fig. 2. Fig. 3.
Plate No. 2.
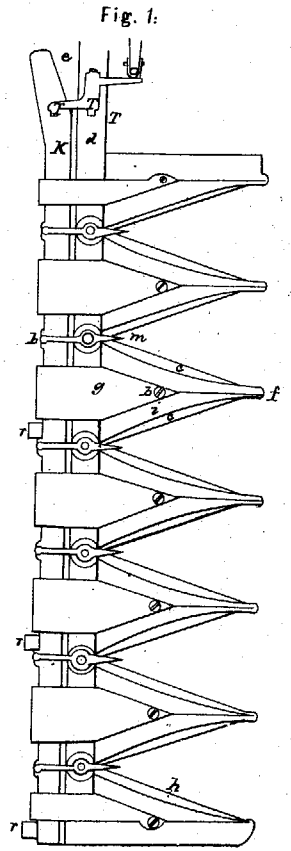
Fig. 1.
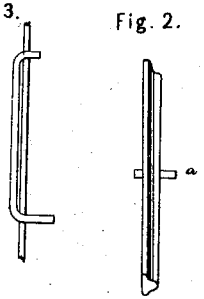
Fig. 2.
Fig. 3.
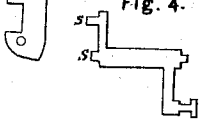
Fig. 4.
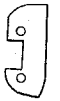
Fig. 5.
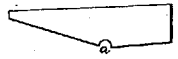
Fig. 6.
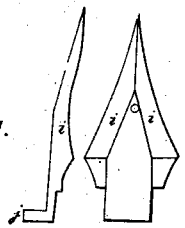
Fig. 7. Fig. 8.
THE NORRIS PETERS CO., WASHINGTON, D. C.

No. 1,485. REISSUED MAY 26, 1863.
J. L. HARDEMAN, DEC'D.
W. N. WHITELEY, ASSIGNEE.
HARVESTING MACHINE.
4 SHEETS—SHEET 3.
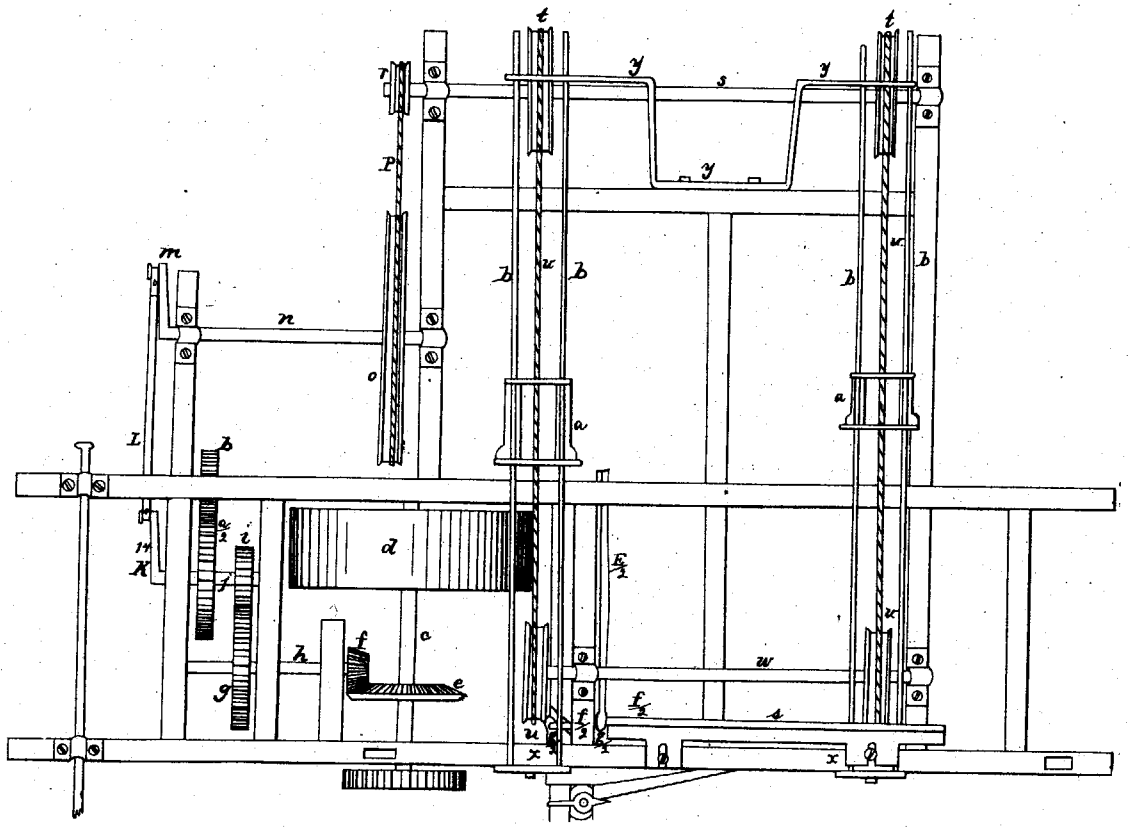
Plate. No. 4.
THE NORRIS PETERS CO., WASHINGTON, D. C.

No. 1,485. REISSUED MAY 26, 1863.
J. L. HARDEMAN, DEC'D.
W. N. WHITELEY, ASSIGNEE.
HARVESTING MACHINE.
4 SHEETS—SHEET 4.
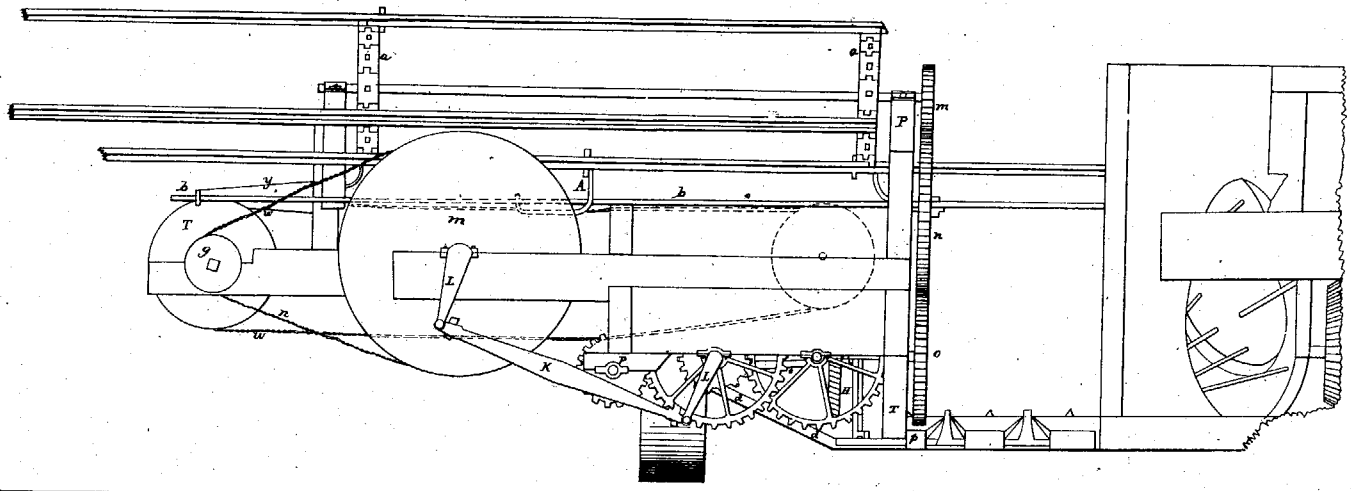
Plate No. 5.
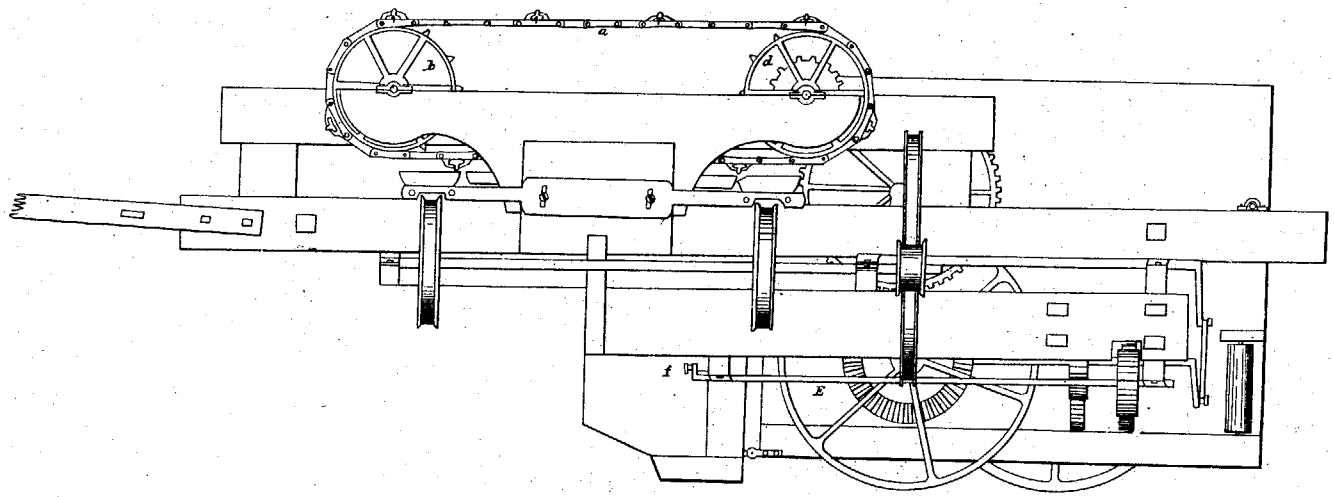
Plate No. 6.
THE NORRIS PETERS CO., WASHINGTON, D. C.

UNITED STATES PATENT OFFICE.

WILLIAM N. WHITELEY, OF SPRINGFIELD, OHIO, ASSIGNEE, BY MESNE ASSIGNMENTS, OF JOHN LOCKE HARDEMAN, DECEASED.

IMPROVEMENT IN HARVESTING-MACHINES.

Specification forming part of Letters Patent No. 7,578, dated August 20, 1850; Reissue No. 1,201, dated June 18, 1861; Reissue No. 1,485, dated May 26, 1863.

DIVISION B.

*To all whom it may concern:*

Be it known that JOHN LOCKE HARDEMAN, of Saline county, near Arrow Rock, and State of Missouri, invented a new and Mode of Removing Hemp, Millet, and other Grain from the Cutting Apparatus of Harvesting-Machines, of which the following is a full, clear, and exact description, reference being had to the accompanying drawings, forming a part of this specification by plates, figures, and letters.

The extra part of the divider or separator consists of a sheet-iron plate *b*, Plate 1, one foot four inches wide, two feet high, and securely fastened by rivets *c c c*, Plate 1, to the divider at the right-hand end of the arm, having a strong wire or rod, *d*, Plate 1, three-eighths of an inch in diameter, in the front edge, rising two feet, and extending upward and back to the wedge *f*, Plate 1, to which it is attached by a small loop, *g*, Plate 1, through which it passes.

The conveyer consists of a wedge, *a a a*, Plate 3, Figure 4, and a cone, *b*, Plate 3, Fig. 4, both resting on a frame-work, *c c c c*, Plate 3, Fig. 4, which is made of four pieces of timber three by six inches, two of them four feet long, and the others two feet six inches long, joined by mortises and tenons, except at *a*, where they are halved together. The wedge *a a a*, Plate 3, Fig. 4, is framed of plank three feet high, with cross-timbers *f f f*, Plate 3, Fig. 4, to strengthen it and form supports for the shafts, with an opening in the left-hand side for the cone *b*, Plate 3, Fig. 4, the whole being attached by a set of simple hinges, *g g g*, Plate 3, Fig. 4, to the back of the arm *d*, Plate 2, Fig. 1, at the points *r r r*, Plate 2, Fig. 1. Within the wedge is a cast-iron wheel, *h*, Plate 3, Fig. 4, two feet in diameter and four inches broad, which supports the conveyer. Upon its shaft *i*, Plate 3, Fig. 4, which is two inches square, is placed a bevel-wheel, *j*, Plate 3, Fig. 4, twelve inches in diameter, thirty-six cogs driving a pinion, *k*, Plate 3, Fig. 4, of twelve cogs. Its shaft L L, Plate 3, Fig. 4, passes through the cone forward and inward to the left-hand side for its bearing at M, Plate 3, Fig. 4. The cone is formed by a head or base, *b*, Plate 3, Fig. 4, made of one-and-a-half-inch plank, one foot six inches in diameter, and an apex, S, also of wood, placed two feet apart on the shaft L L, Plate 3, Fig. 4, with eight rods, *n*, Plate 3, Fig. 4, two feet six inches long, arranged at equal distances around the circumference and extending beyond the base. The lower side of the cone is parallel to the frame-work below. The cone revolves backward and inward and removes the butt-end of the hemp, &c., to the left, after being dropped by the sustaining-rod *h*, Plate 1, which is withdrawn by the hand of an attendant whenever a bundle of convenient size has accumulated. A small roller, *p*, Plate 3, Fig. 4, twelve inches long and three in diameter, is placed vertically at the left-hand corner of the wedge to prevent the hemp, &c., from being entangled and drawn forward by the machine.

The frame-work is of solid oak timber two inches thick, and joined as in the plates, which are on a scale of two inches to the foot, except Plate 4, which is one and a third inches to the foot.

It will be seen from the foregoing description and from the drawings that the finger-bar which sustains the cutting apparatus with which the above-described parts are used has below a portion of it an open unobstructed space, bounded by that part of said bar which is between the inner end of the cutting apparatus and the vertical plane in which the cutter's driving-wheel moves, said plane and a line drawn therefrom to the lowest part of the divider touching the same part of the first projecting point or shoe. This space assists said part of the bar in its passage over the crop cut at a preceding round of the machine.

It will also be observed that the first projecting point or shoe, at the inner end of the cutting apparatus, is so constructed and so connected to the finger-bar which sustains said apparatus as to contain the seven following elements: First, its rear end is as low as that part of the finger-bar from which it projects, whereby that part of the bar is enabled to pass over anything that said rear end passes over without dragging it forward; second, its under side is sloped forward and upward from near the front edge of the finger-bar to the front end of the shoe, which enables it to slide freely over whatever its front end passes over; third, the cut crop cannot pass backward over its front end; fourth, it sustains the finger-bar against lateral strain, as the draft of the team passes through it to the finger-bar; fifth, it holds up the front edge of the finger-bar, and with it the fingers or projecting points; sixth, it inclines outward that portion of the crop brought between it and the first dividing-point; and seventh, it forms or sustains the fixed part of the shears, against which the inside edge of the inside cutter cuts the standing crop.

By means of that part of the invention of the said JOHN LOCKE HARDEMAN, deceased, which is included in this division side-cutting harvesters have been made to operate upon different principles and to accomplish results never before accomplished by them.

The advantages gained by the invention herein described and claimed will readily be understood by those familiar with harvesters from the foregoing description and from the claims.

What I claim as new, and desire to secure by this patent as the invention of the said JOHN LOCKE HARDEMAN, is—

1. The combination of a wedge or guiding-board with the platform or frame-work in rear of the cutting apparatus of a side-cutting harvester having moving cutters, each of which cuts from and toward the main frame, and with the separator at the outer end of said apparatus, so as to incline or guide the cut crop from the cutting apparatus when pushed heads foremost therefrom over the platform or frame-work in such a direction that the butts of that portion of it cut by the outer end of said apparatus will, when on the ground, be farther back than those cut at the same time by the inner end of said apparatus.

2. The construction and combination of an automatic conveying or discharging mechanism with the side-cutting apparatus of the harvester described in the first claim, its platform or frame-work, and the guiding-board thereto secured, whereby it is enabled to move the cut crop heads foremost from the cutting apparatus over the platform, and so deposit it on the ground that the butts of that portion of it cut by the outer end of the cutting apparatus will be farther back than that cut at the same time by the inner end.

3. The connection of the aforesaid platform, with its wedge or guiding-board thereto secured, to the finger-bar of the harvester described in the first claim, whereby the attendant of the machine can detach and attach it at pleasure.

4. The use, in combination with a cutting apparatus having moving cutters, each of which cuts from and toward the main frame, of a sustaining-rod upon which the bunches or gavels may be formed, and which is withdrawn inward endwise from under them for effecting their discharge from the cutting apparatus.

5. The combination of a rack or reel with the platform or frame-work and wedge or guiding-board described in the first claim.

6. The combination of a rack or reel with an automatic conveying or discharging mechanism which moves the cut crop heads foremost from the cutting apparatus described in the first claim, in the manner therein described.

7. The combination of a rack or reel with the cutting apparatus described in the first claim and the gaveling device described in the fourth claim.

8. The combination or arrangement of the following parts of a side-cutting harvester having moving cutters, each of which cuts from and toward the main frame, viz: a rack or reel in front of said cutters for pressing the standing crop toward them, the open unobstructed space between the first of said cutters and the vertical plane in which their driving-wheel moves, herein described, and the platform or frame-work in rear of said cutters, so secured thereto that the attendant can detach it at pleasure, so as to allow the cut crop to fall to the ground as fast as cut.

9. The combination or arrangement of the following parts of a side-cutting harvester having moving cutters, each of which cuts from and toward the main frame, viz: a rack or reel in front of said cutters for pressing the standing crop toward them, the open unobstructed space between the first of said cutters and the vertical plane in which their driving-wheel moves, herein described, the projecting point or shoe at the inner end of the cutting apparatus heretofore described, and the platform or frame-work in rear of said cutters, so secured thereto that the attendant can detach it at pleasure, so as to allow the cut crop to fall to the ground as fast as cut.

In witness whereof I have hereunto subscribed my name.

WM. N. WHITELEY.

In presence of—
GEO. W. BENNS,
AMOS WHITELEY.